US012240033B2

(12) United States Patent
Leber et al.

(10) Patent No.: US 12,240,033 B2
(45) Date of Patent: Mar. 4, 2025

(54) MULTI-PART CONDUIT BENDER HANDLE

(71) Applicant: TEMCo Industrial, LLC, Brenham, TX (US)

(72) Inventors: Josh L. Leber, Brenham, TX (US); Bryan C. Blaylock, Brenham, TX (US)

(73) Assignee: TENCO INDUSTRIAL, LLC, Brenham, TX (US)

( * ) Notice: Subject to any disclaimer, the term of this patent is extended or adjusted under 35 U.S.C. 154(b) by 0 days.

(21) Appl. No.: 18/613,230

(22) Filed: Mar. 22, 2024

(65) Prior Publication Data

US 2024/0316609 A1 Sep. 26, 2024

Related U.S. Application Data

(60) Provisional application No. 63/454,095, filed on Mar. 23, 2023.

(51) Int. Cl.
*B25G 3/36* (2006.01)
*B21D 7/06* (2006.01)
*B25G 1/00* (2006.01)

(52) U.S. Cl.
CPC ............... *B21D 7/063* (2013.01); *B25G 1/00* (2013.01); *B25G 3/36* (2013.01)

(58) Field of Classification Search
CPC ... B25G 1/00; B25G 1/04; B25G 3/36; B21D 7/063
USPC .................................................... 72/478, 479
See application file for complete search history.

(56) References Cited

U.S. PATENT DOCUMENTS

| | | | | | |
|---|---|---|---|---|---|
| 597,000 | A * | 1/1898 | Higbee | F16L 15/004 | 285/333 |
| 4,033,615 | A * | 7/1977 | Miller, Jr. | F16L 15/006 | 285/333 |
| 4,726,399 | A * | 2/1988 | Miller | F16L 41/03 | 285/133.11 |
| 4,796,928 | A * | 1/1989 | Carlin | F16L 15/009 | 285/390 |
| 5,221,113 | A * | 6/1993 | Stoll | F16B 33/02 | 285/333 |
| 5,915,911 | A * | 6/1999 | Hodgetts | B60P 1/38 | 414/527 |
| 6,905,080 | B2 * | 6/2005 | Pohorecki | B05B 13/04 | 239/281 |
| 6,991,268 | B2 * | 1/2006 | Spears | F16L 15/08 | 285/329 |
| 11,066,880 | B2 * | 7/2021 | Griffith | E21B 21/06 | |

(Continued)

*Primary Examiner* — Edward T Tolan
(74) *Attorney, Agent, or Firm* — Donald J. Ersler

(57) ABSTRACT

A multi-part conduit bender handle preferably includes at least a lower tube and an upper tube. The lower tube preferably has an outer diameter, which allows a ¾ male national pipe tap (NPT) to be formed on opposing ends thereof. One end of the lower tube is threaded into a female ¾ NPT in a conduit bender head. An inner diameter of the upper tube is preferably sized to receive a ¾ EMT conduit. A modified ¾ female NPT is formed in one end of the upper tube and an opposing end is left open for insertion of the ¾ EMT conduit. The first modification difference is the inner diameter of the upper tube is preferably enlarged to about 1.00 inch on one end and the second modification difference is the depth of the modified ¾ NPT threads is preferably increased to about 0.85 inches.

12 Claims, 7 Drawing Sheets

(56) References Cited

U.S. PATENT DOCUMENTS

| | | | | |
|---|---|---|---|---|
| 11,235,443 | B2 * | 2/2022 | Harvey | B25B 13/5058 |
| 11,318,334 | B2 * | 5/2022 | Haggett | A62C 8/04 |
| 11,415,246 | B2 * | 8/2022 | Ando | F16L 15/001 |
| 11,788,566 | B2 * | 10/2023 | Willis | B25G 1/04 403/296 |
| 2005/0263641 | A1 * | 12/2005 | Hill Fraser | B65H 16/04 242/597.5 |
| 2008/0106092 | A1 * | 5/2008 | Klein | F16L 41/02 285/5 |
| 2014/0165686 | A1 * | 6/2014 | Ukolowicz | F28D 7/16 165/157 |
| 2020/0078924 | A1 * | 3/2020 | Cavaliere | B25G 1/04 |
| 2020/0149665 | A1 * | 5/2020 | Dirneder | F16L 17/06 |
| 2024/0165686 | A1 * | 5/2024 | Pridemore | B25G 3/02 |

* cited by examiner

MULTI-PART CONDUIT BENDER HANDLE

CROSS REFERENCE TO RELATED APPLICATIONS

This application claims the benefit of U.S. provisional patent application No. 63/454,095 filed Mar. 23, 2023, which is thereby incorporated by reference in its entirety.

BACKGROUND OF THE INVENTION

1. Field of the Invention

The present invention relates generally to tools and more specifically to a multi-part conduit bender handle, which allows a conduit bender to be shipped in a container, which is more compact than that of the prior art, because a length of the handle is reduced into at least two tubes.

2. Discussion of the Prior Art

It appears that the prior art does not teach or suggest a multi-part conduit bender handle, which includes a modified female NPT thread formed in one of the tubes that provides a mechanically solid reliable handle to operate the conduit bender, while not unthreading from each other during use of the conduit bender.

Accordingly, there is a clearly felt need in the art for a multi-part conduit bender handle, which may be easily assembled; has the requisite strength for use with a conduit bender head; and will not unthread during use.

SUMMARY OF THE INVENTION

The present invention provides a multi-part conduit bender handle, which allows a conduit bender to be shipped in a container, which is more compact than that of the prior art. The multi-part conduit bender handle preferably includes at least a lower tube and an upper tube. The lower tube has an outer diameter, which preferably allows a ¾ male national pipe tap (NPT) to be formed on opposing ends thereof. However, other outer diameter sizes may be used to accommodate other national pipe tape sizes. One end of the lower tube is threaded into a female ¾ NPT in a conduit bender head. An inner diameter of the upper tube is preferably greater than an outer diameter of a ¾ EMT conduit, such that the ¾ EMT conduit may be inserted into an inner diameter of the upper tube. A length of the upper tube is preferably the same length as the lower tube. A preferable inner diameter of the upper tube is at least 0.974 inches.

A modified ¾ female NPT is formed in one end of the upper tube and an opposing end is left open for insertion of the ¾ EMT conduit. The opposing end of the upper tube is also preferably chamfered or deburred for safety reasons. The modified ¾ female NPT provides a threaded connection that includes the locking characteristics of a tapered thread with the thread depth engagement of a straight cut thread. The modified ¾ female NPT includes a 60-degree thread angle, taper angle, root and crest. However, there are two primary differences between a standard ¾ female NPT thread and the modified ¾ female NPT. The first difference is the inner diameter of the upper tube is preferably enlarged to 1.00 inches and the second difference is the depth of the threads are increased to about 0.85 inches. A portion of the inner diameter of the upper tube is enlarged on one end for a depth of the modified ¾ female NPT. As a result of the increased inner diameter, the ¾ male NPT threads on the lower tube will fully engage the modified ¾ female NPT threads of the upper tube. The result is that when torque is applied to the handle, there is no flexing in the screw joint between the upper and lower tubes, which can lead to loosening or mechanical failure. However, other methods of joining the lower tube to the upper tube may also be used.

Accordingly, it is an object of the present invention to provide a multi-part conduit bender handle, which may be easily assembled; has the requisite strength for use with a conduit bender; and will not unthread during use.

Accordingly, it is an object of the present invention to provide a multi-part conduit bender handle, which may be easily assembled.

It is an object of the present invention to provide a multi-part conduit bender handle, which has the requisite strength for use with a conduit bender.

Finally, it is another object of the present invention to provide a multi-part conduit bender handle, which will not unthread during use.

These and additional objects, advantages, features and benefits of the present invention will become apparent from the following specification.

DETAILED DESCRIPTION OF THE PREFERRED EMBODIMENTS

Figure 1:
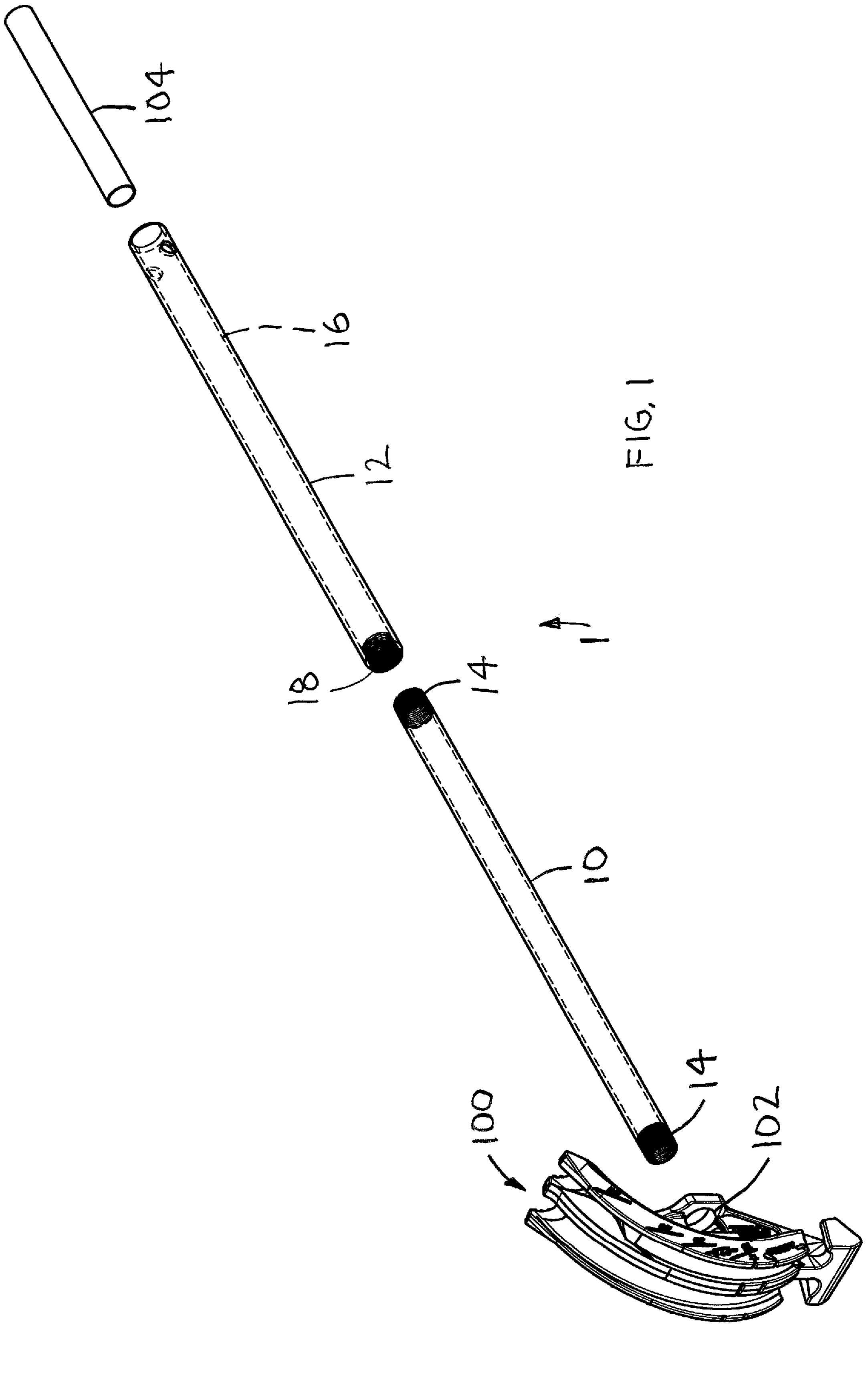
FIG. 1 is an exploded perspective view of a multi-part conduit bender handle with a conduit bender head and a EMT conduit in accordance with the present invention.

With reference now to the drawings, and particularly to FIG. 1, there is shown an exploded perspective view of a multi-part conduit bender 1. The multi-part conduit bender handle 1 preferably includes at least a lower tube 10 and an upper tube 12. The lower tube 10 includes an outer diameter, which includes a ¾ male national pipe tap (NPT) 14 to be formed on opposing ends thereof. However, other outer diameter sizes may be used to accommodate other national pipe tape sizes, such as ½ NPT or 1" NPT. One end of the lower tube 10 is threaded into a female ¾ NPT 102 in a conduit bender head 100. An inner diameter 16 of the upper tube 12 is preferably greater than an outer diameter of a ¾ EMT conduit 104, such that the ¾ EMT conduit may be inserted into the inner diameter 16 of the upper tube 12. A length of the upper tube 12 is preferably the same length as the lower tube 10. A preferable inner diameter of the upper tube 12 is at least 0.97 inches.

Figure 3:
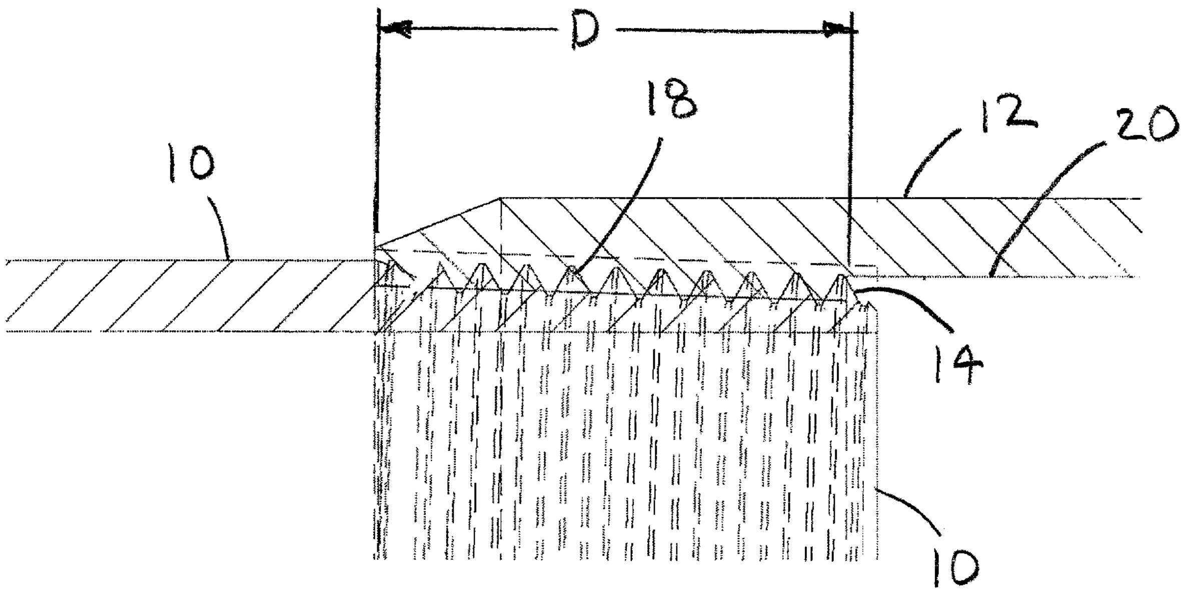
FIG. 3 is an enlarged partial cross-sectional view of a male NPT thread engaged with a modified female NPT thread of a multi-part conduit bender in accordance with the present invention.

With reference to FIG. 3, a modified ¾ female NPT 18 is preferably formed in one end of the upper tube 12 and an opposing end is preferably left open for insertion of the ¾ EMT conduit 104. The opposing end of the upper tube 12 is also preferably chamfered or deburred for safety reasons. The modified ¾ female NPT 18 provides a threaded connection that includes the locking characteristics of a tapered thread with the thread depth engagement of a straight cut thread. The modified ¾ female NPT 18 includes a 60-degree thread angle, taper angle, root and crest. However, there are two primary differences between a standard ¾ female NPT thread and the modified ¾ female NPT. The first difference is the inner diameter 20 of the upper tube is preferably enlarged to about 1.00 inches from 0.97 inches and the second difference is a depth "D" of the modified ¾ NPT female threads 18 is increased to about 0.85 inches. The increased inner diameter 20 is enlarged for a depth "D" of the modified ¾ female NPT 18. As a result of the increased inner diameter 20, the ¾ male NPT 14 on the lower tube 10 will fully thread into the modified ¾ female NPT 18 of the upper tube 12. The result is that when torque is applied to the multi-part conduit handle 1, there is no flexing in the screw joint between the upper tube 12 and the lower tube 10, which can lead to loosening or mechanical failure.

NPT threads as defined by ANSI B1.20.1 is a general-purpose tapered thread most commonly used to couple pipes for carrying air, water, oil, gas, etc. The pipes are designed to be wrench tightened to create a locking joint that when combined with a sealing agent, provides a liquid or gas tight connection. The characteristics of NPT (also known as ANSI/ASME B1.20.1 Pipe Threads, General Purpose) are as follows: the angle between the taper and the center axis of the pipe is 1o 47' 24" (1.7899o) truncation of roots and crests are a flat 60-degree thread angle pitch, which is measured in threads per inch (TPI). If the threads 18, 20 were cut to follow the ANSI B1.20.1 standards, which generally reach the point of tightness, after 4 to 5 turns, there would not be enough thread engagement. In standard use for sealing, 4 to 5 turns provide plenty of thread engagement to provide for desired sealing qualities. In the application of a handle for a conduit bender, the upper tube 12 and the lower tube 10 are subjected to a shear force and if a standard taper to taper thread were used, there would not be enough material overlap in the threads to create a joint capable of sustaining the mechanical stresses of a handle for a conduit bender.

Figure 2:
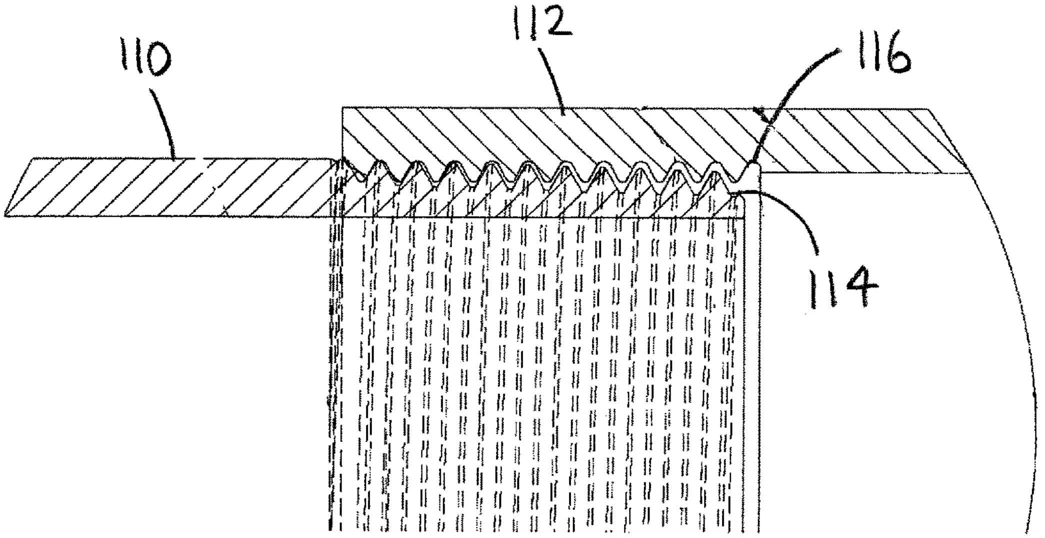
FIG. 2 is an enlarged partial cross-sectional view of a male NPT thread on a lower tube engaged with a straight thread of an upper tube.

With reference to FIG. 2, a first tube 110 is threadably engaged with a second tube 112. If a male NPT thread 114 is formed on the first tube 110 and a female straight thread 116 is formed on the second tube 112, the result is that the male NPT threads would only be fully supported at the very beginning of the straight female threads 116. A gap results at the far end of the thread joint between the lower tube 10 and the upper tube 12, which would allow for flex in the connection, when torque is applied to the conduit bender handle when forming conduit bends. There would not be enough material overlap in the threads to create a joint capable of sustaining the mechanical stresses of a handle for a conduit bender. Further, the resulting flex would result in the threads 114, 116 loosening or a total mechanical failure of the conduit bender handle.

Figure 4:
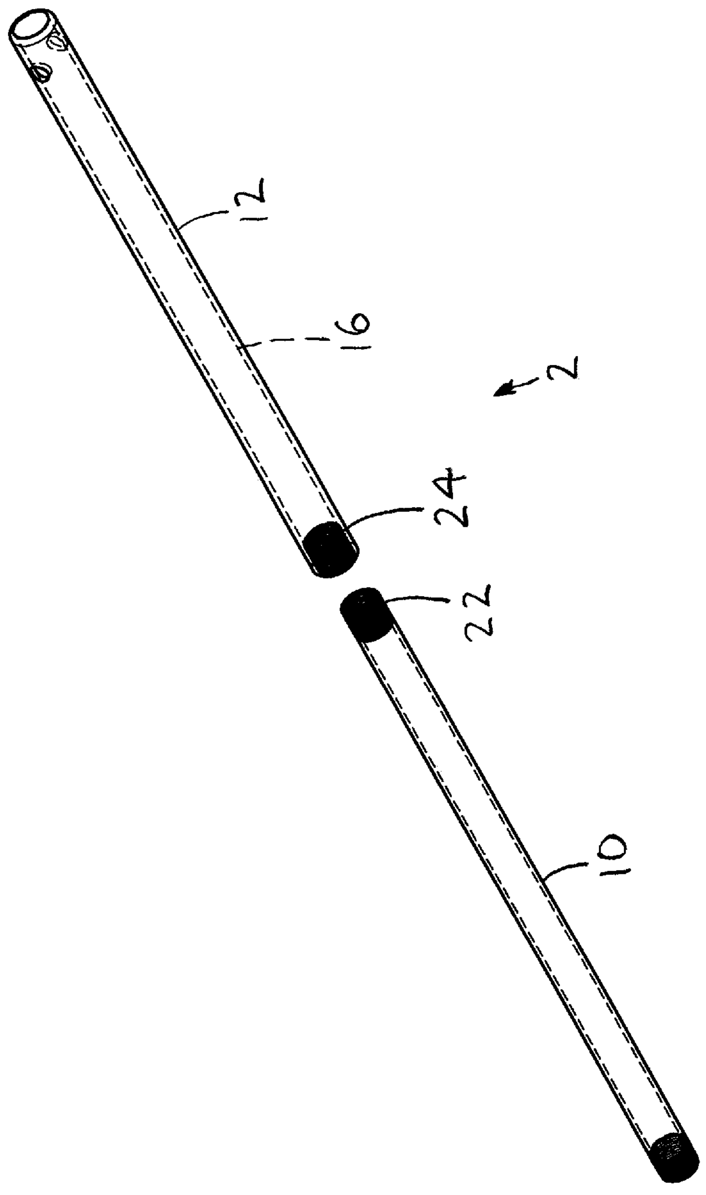
FIG. 4 is an exploded perspective view of a multi-part conduit bender handle using straight threads to engage the lower tube with the upper tube in accordance with the present invention.
Figure 5:
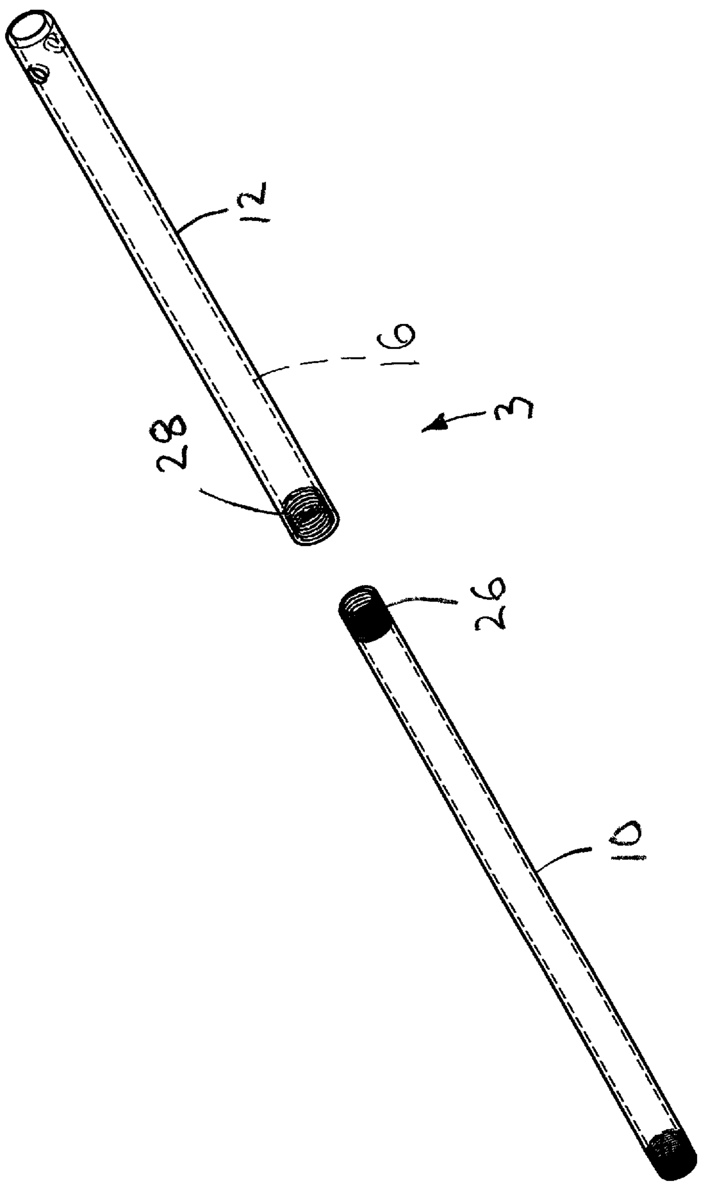
FIG. 5 is an exploded perspective view of a multi-part conduit bender handle using coarse threads to engage the lower tube with the upper tube in accordance with the present invention.

There are other methods of joining the lower tube 10 to the upper tube 12 besides that illustrated in FIGS. 1-3. With reference to FIG. 4, a multi-part conduit bender handle 2 includes forming straight male threads 22 on the lower tube 10 and straight female threads 24 in the inner diameter 16 of the upper tube 12. The straight male threads 22 are screwed into the female threads 24. A locking compound may be applied to the threads 22, 24 to prevent the lower tube 10 from unscrewing from the upper tube 12. With reference to FIG. 5, a multi-part conduit bender handle 3 includes forming coarse male threads 26 on the lower tube 10 and coarse female threads 28 in the inner diameter 16 of the upper tube 12. The coarse male threads 26 are screwed into the coarse female threads 28. A locking compound may be applied to the threads 26, 28 to prevent the lower tube 10 from unscrewing from the upper tube 12.

Figure 6:
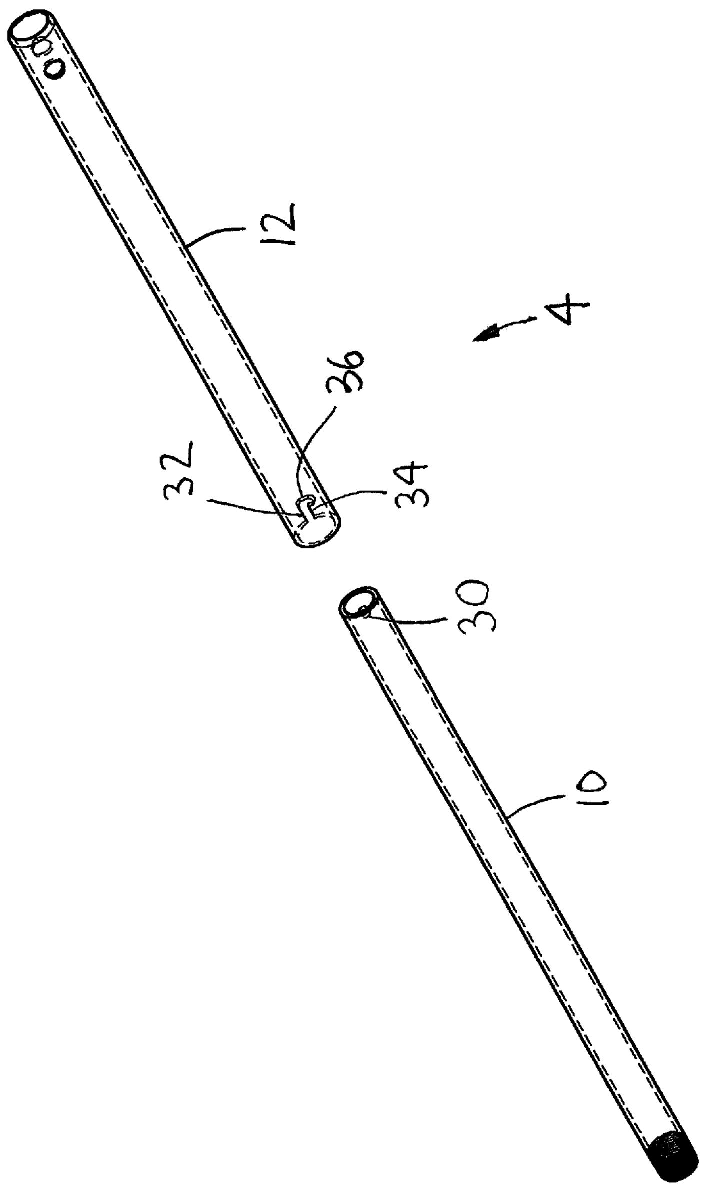
FIG. 6 is an exploded perspective view of a multi-part conduit bender handle using a twist lock to engage the lower tube with the upper tube in accordance with the present invention.

With reference to FIG. 6, a multi-part conduit bender handle 4 includes extending a pin projection 30 from an outer surface of one end of the lower tube 10 and forming a twist slot 32 through an end of the upper tube 12. The twist slot 32 includes an entrance portion 34 and a locking portion 36. The locking portion 36 terminates an end of the entrance portion 34 and the locking portion 36 is preferably perpendicular to the entrance portion 34. The lower tube 10 is inserted into the upper tube 12, such that the pin projection 30 enters the entrance portion 34 and is locked in the locking portion 36.

Figure 7:
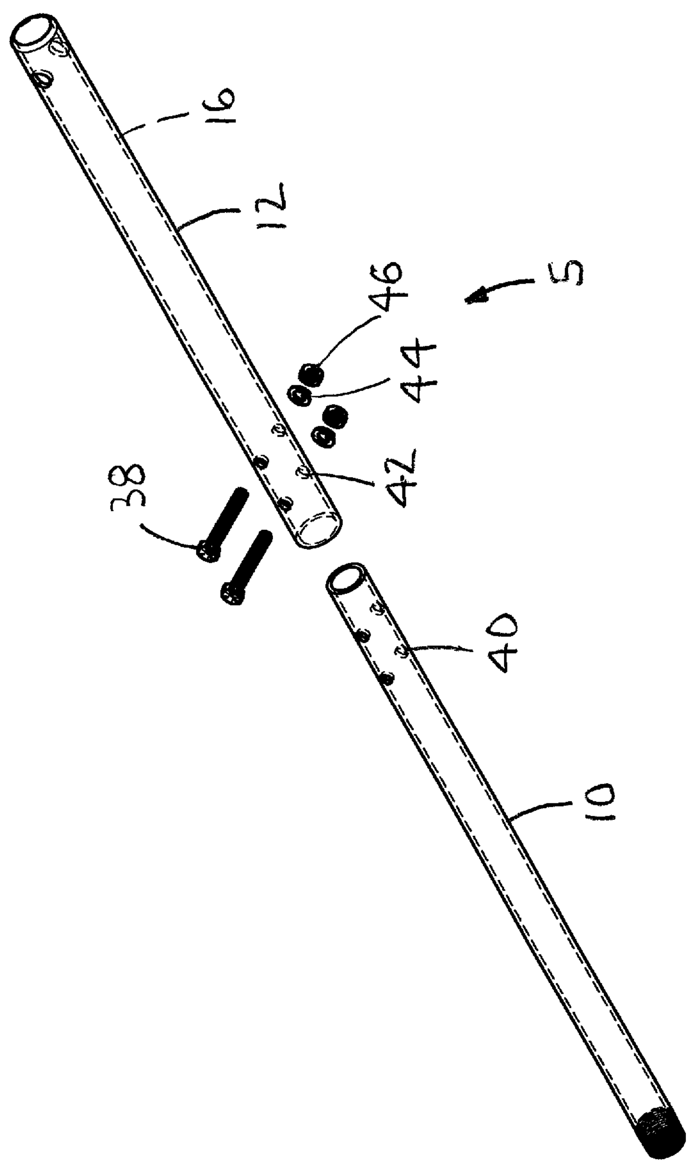
FIG. 7 is an exploded perspective view of a multi-part conduit bender handle using two fasteners to engage the lower tube with the upper tube in accordance with the present invention.

With reference to FIG. 7, a multi-part conduit bender handle 5 includes at least one threaded fastener 38, forming at least one lower fastener hole 40 through one end of the lower tube 10 and forming at least one upper fastener hole 42 through an end of the upper tube 12. The one end of the lower tube 10 is inserted into the inner diameter 16 of the upper tube 12, such that the at least one lower fastener hole 40 aligns with the at least one upper fastener hole 42. The at least one threaded fastener 38 is inserted through the at least one hole 40, 42. The at least one thread fastener 38 is preferably secured with at least one washer 44 and at least one nut 46.

Figure 8:
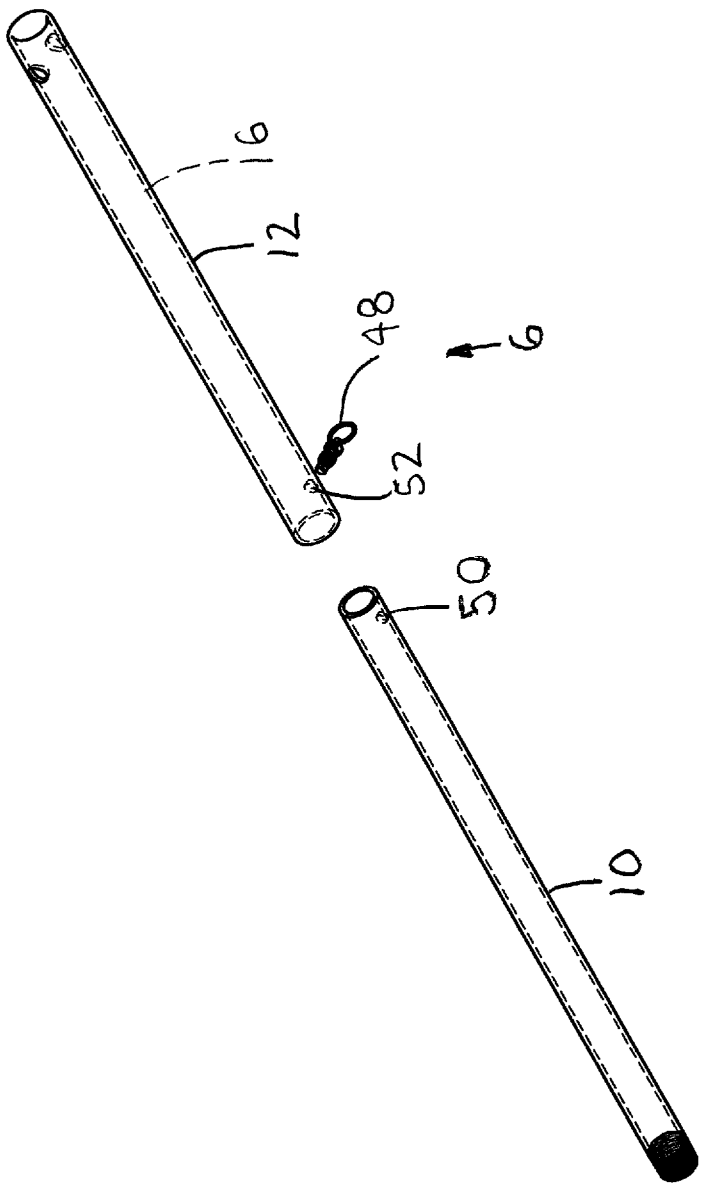
FIG. 8 is an exploded perspective view of a multi-part conduit bender handle using a spring pin to engage the lower tube with the upper tube in accordance with the present invention.

With reference to FIG. 8, a multi-part conduit bender handle 6 includes a spring pin 48, forming a lower pin hole 50 through one end of the lower tube 10 and forming a spring pin hole 52 through an end of the upper tube 12. The spring pin 48 is secured in the spring pin hole 52 with any suitable method. The spring pin 48 is retracted and the one end of the lower tube 10 is inserted into the inner diameter 16 of the upper tube 12, such that the lower pin hole 40 aligns with a spring-loaded projection of the spring pin 48.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:

1. A multi-part conduit bender handle for attachment to a conduit bender head, the conduit bender head includes female NPT standard threads, comprising:

a lower tube includes male NPT standard threads formed on opposing ends thereof, the female NPT standard threads of the conduit bender head are adapted to threadably receive said male NPT standard threads of one end of said lower tube; and an upper tube includes an inner diameter, a modified NPT female thread bore is formed in at least one end of said inner diameter of said upper tube to form modified female NPT threads, said modified NPT female threads have a diameter of about one inch and a depth of about 0.85 inches, said modified NPT female thread bore has a greater diameter than a standard NPT female thread bore for forming standard NPT female threads, a standard NPT tap is used to create said modified NPT female threads in said modified NPT female thread bore, a depth of said modified NPT female thread bore is greater than a depth of the standard NPT female thread bore, wherein said male NPT standard threads have complete engagement with said modified female NPT threads for said depth of said modified NPT female threads, wherein threadable engagement of said male NPT standard threads of said lower tube and said modified NPT female threads of said upper tube provide a rigid connection between said upper and lower tubes.

2. The multi-part conduit bender handle for attachment to a conduit bender head of claim 1, wherein:

a size of said male NPT threads is ¾ inch.

3. The multi-part conduit bender handle for attachment to a conduit bender head of claim 1, wherein:

a size of said modified female NPT threads is ¾ inch.

4. The multi-part conduit bender handle for attachment to a conduit bender head of claim 1, wherein:

a size of said male NPT threads is ¾ inch.

5. The multi-part conduit bender handle for attachment to a conduit bender head of claim 1, wherein:

a size of said modified female NPT threads is ¾ inch.

6. The multi-part conduit bender handle for attachment to a conduit bender head of claim 5, wherein:

said upper handle is fabricated from a single metallic tube.

7. The multi-part conduit bender handle for attachment to a conduit bender head of claim 1, wherein:

said upper handle is fabricated from a single metallic tube.

8. A multi-part conduit bender handle for attachment to a conduit bender head, comprising:

a lower tube includes male NPT standard threads formed on opposing ends thereof;

the conduit bender head includes female NPT threads which are sized to threadably receive said male NPT standard threads on one end of said lower tube for rigid engagement of said conduit bender head to said lower tube; and an upper tube includes an inner diameter, a modified NPT female thread bore is formed in at least one end of said inner diameter of said upper tube to form modified female NPT threads, said modified NPT female threads have a diameter of about one inch and a depth of about 0.85 inches, said modified NPT female thread bore has a greater diameter than a standard NPT female thread bore for forming standard NPT female threads, a standard NPT tap is used to create said modified NPT female threads in said modified NPT female thread bore, a depth of said modified NPT female thread bore is greater than a depth of the standard NPT female thread bore, wherein said male NPT standard threads have complete engagement with said modified female NPT threads for said depth of said modified NPT female thread bore, wherein threadable engagement of said male NPT standard threads of said lower tube and said modified NPT female threads of said upper tube provide a rigid connection between said upper and lower tubes.

9. The multi-part conduit bender handle for attachment to a conduit bender head of claim 8, wherein:

a size of said male NPT threads is ¾ inch.

10. The multi-part conduit bender handle for attachment to a conduit bender head of claim 8, wherein:

a size of said modified female NPT threads is ¾ inch.

11. The multi-part conduit bender handle for attachment to a conduit bender head of claim 8, wherein:

said upper handle is fabricated from a single metallic tube.

12. A multi-part conduit bender handle for attachment to a conduit bender head, the conduit bender head includes female NPT standard threads, comprising:

a lower tube includes male NPT standard threads formed on opposing ends thereof, the female NPT standard threads of the conduit bender head are adapted to threadably receive said male NPT standard threads of one end of said lower tube; and an upper tube includes an inner diameter a modified NPT female thread bore is formed in at least one end of said inner diameter of said upper tube to form modified female NPT threads, said modified NPT female threads have a diameter of about one inch and a depth of about 0.85 inches, said modified NPT female thread bore is greater in diameter than a NPT standard female thread bore for forming standard NPT female threads, a standard NPT tap is used to create said modified NPT female threads in said modified NPT female thread bore, a depth of said modified NPT female thread bore having a length of about 0.85 inches is greater than a depth of a NPT standard female thread bore, wherein said male NPT standard threads have complete engagement with said modified female NPT standard threads for said depth of said modified NPT female thread bore, wherein threadable engagement of said male NPT standard threads of said lower tube and said modified NPT female threads of said upper tube provide a rigid connection between said upper and lower tubes.

* * * * *